United States Patent
Yamasaki et al.

(10) Patent No.: US 9,928,612 B2
(45) Date of Patent: Mar. 27, 2018

(54) INFORMATION PROCESSING APPARATUS

(71) Applicant: FUJI XEROX CO., LTD., Tokyo (JP)

(72) Inventors: Hideki Yamasaki, Yokohama (JP);
Yuichi Kawata, Yokohama (JP); Ryoko Saitoh, Yokohama (JP); Yoshifumi Bando, Yokohama (JP); Kensuke Okamoto, Yokohama (JP); Tomoyo Nishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/198,545

(22) Filed: Jun. 30, 2016

(65) Prior Publication Data

US 2017/0249741 A1  Aug. 31, 2017

(30) Foreign Application Priority Data

Feb. 26, 2016  (JP) ................. 2016-035671

(51) Int. Cl.
| | |
|---|---|
| *H04N 1/00* | (2006.01) |
| *G06K 15/02* | (2006.01) |
| *G06F 3/12* | (2006.01) |
| *G06T 7/73* | (2017.01) |

(52) U.S. Cl.
CPC ........... *G06T 7/73* (2017.01); *H04N 1/00251* (2013.01); *H04N 2201/0017* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0316193 | A1* | 12/2009 | Kohara | G03G 15/5016 358/1.15 |
| 2011/0109937 | A1* | 5/2011 | Fujiki | H04N 1/00885 358/1.15 |
| 2014/0139863 | A1* | 5/2014 | Harada | H04N 1/00315 358/1.14 |
| 2015/0055158 | A1* | 2/2015 | Ogata | H04N 1/00381 358/1.13 |

FOREIGN PATENT DOCUMENTS

| | | | | |
|---|---|---|---|---|
| JP | 2000-250361 A | | 9/2000 | |
| JP | 2001-202551 | * | 7/2001 | ............... G07D 9/00 |
| JP | 2009-137434 | * | 6/2009 | ............ B60R 25/10 |
| JP | 2011-086002 A | | 4/2011 | |
| JP | 2012-230619 A | | 11/2012 | |
| JP | 2015-002382 | * | 1/2015 | ............... H04N 1/00 |
| JP | 2015-002382 A | | 1/2015 | |

* cited by examiner

*Primary Examiner* — Beniyam Menberu
(74) *Attorney, Agent, or Firm* — Oliff PLC (57) ABSTRACT

There is provided an information processing apparatus. A determination unit determines whether an object is present in a predetermined place. A specification unit specifies a direction of a toe of a user who uses the information processing apparatus. A notification unit performs a notification to the user in a case where a predetermined direction of the toe is specified and it is determined that the object is present in the place.

6 Claims, 8 Drawing Sheets

| TYPE OF OBJECT | NOTIFICATION CONDITION |
|---|---|
| DRIVER'S LICENSE, HEALTH INSURANCE CARD | CHANGE IN DIRECTION OF ONE FOOT |
| OTHERS | CHANGE IN DIRECTION OF BOTH FEET |

| QUANTITY OF OBJECT | NOTIFICATION CONDITION |
|---|---|
| THRESHOLD Th1 OR MORE | CHANGE IN DIRECTION OF ONE FOOT |
| LESS THAN THRESHOLD Th1 | CHANGE IN DIRECTION OF BOTH FEET |

| CHARACTER INFORMATION | NOTIFICATION CONDITION |
|---|---|
| INCLUDING NAME, ADDRESS, TELEPHONE NUMBER | CHANGE IN DIRECTION OF ONE FOOT |
| NOT INCLUDING NAME, ADDRESS, TELEPHONE NUMBER | CHANGE IN DIRECTION OF BOTH FEET |

| TYPE OF OBJECT | THRESHOLD OF DEVIATION IN DIRECTION OF TOE |
|---|---|
| DIRVER'S LICENSE, HEALTH INSURANCE CARD | θ11 |
| OTEHRS | θ12(θ11＜θ12) |

FIG. 16B

| QUANTITY OF OBJECTS | THRESHOLD OF DEVIATION IN DIRECTION OF TIPTOE |
|---|---|
| THRESHOLD Th1 OR MORE | θ21 |
| LESS THAN THRESHOLD Th1 | θ22(θ21＜θ22) |

# INFORMATION PROCESSING APPARATUS

CROSS-REFERENCE TO RELATED APPLICATIONS

This application is based on and claims priority under 35 U.S.C. § 119 from Japanese Patent Application No. 2016-035671 filed on Feb. 26, 2016.

TECHNICAL FIELD

The present invention relates to an information processing apparatus.

SUMMARY

According to a first aspect of the embodiments of the present invention, there is provided an information processing apparatus, comprising: a determination unit that determines whether an object is present in a predetermined place; a specification unit that specifies a direction of a toe of a user who uses the information processing apparatus; and a notification unit that performs a notification to the user in a case where a predetermined direction of the toe is specified and it is determined that the object is present in the place.

BRIEF DESCRIPTION OF THE DRAWINGS

Exemplary embodiments of the present invention will be described in detailed based on the following figures, wherein.

DETAILED DESCRIPTION

[1] Examples

Figure 1:
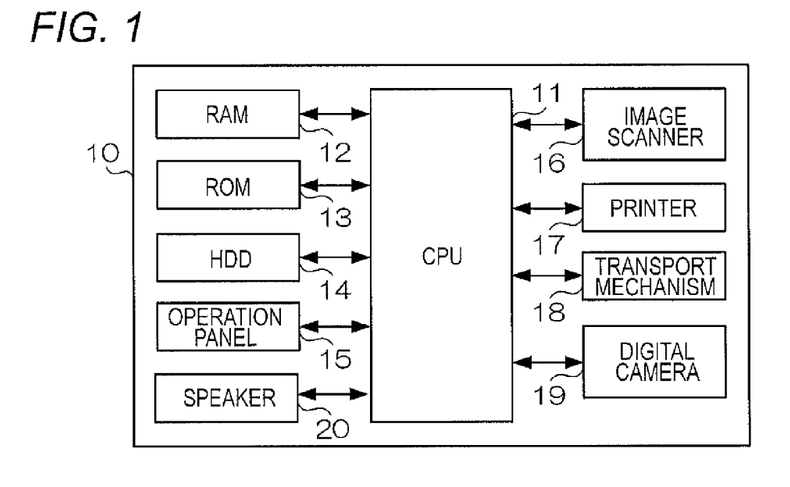
FIG. 1 is a diagram illustrating a hardware configuration of an image processing system according to an example.

FIG. 1 illustrates a hardware configuration of an image processing system 10 according to an example. The image processing system 10 provides image processing functions such as scan, print, copy, and facsimile. The image processing system 10 is a computer which is provided with a CPU (Central Processing Unit) 11, a RAM (Random Access Memory) 12, a ROM (Read Only Memory) 13, an HDD (Hard Disk Drive) 14, an operation panel 15, an image scanner 16, a printer 17, a transport mechanism 18, a digital camera 19, and a speaker 20.

The CPU 11 controls operations of the respective units by executing a program stored in the ROM 13 or the HDD 14 using the RAM 12 as a work area. The HDD 14 is a storage unit which stores data and programs used to control the CPU 11. The storage unit is not limited to the HDD, but may be another recording medium such as an SSD (Solid State Drive).

The operation panel 15 is provided with a touch screen and buttons, and displays information indicating a state of an own device and a state of processing. The operation panel receives a user's operation through a displayed image such as an operating factor, or receives an operation through button pressing. The image scanner 16 is provided with an image sensor to optically read out an image displayed in a surface of a sheet. The image scanner 16 supplies image data indicating the read-out image to the CPU 11.

The printer 17 forms, for example, an image in the sheet through an electrophotographic system. The transport mechanism 18 is a mechanism for transporting a sheet, and transports a sheet from which an image is read out by the image scanner 16 and a sheet in which an image is formed by the printer 17. The digital camera 19 is provided with a lens and an image capturing device, and captures a person and a scene of surroundings which are expressed by the incident light passing through the lens. The speaker 20 is provided with a digital-analog converter circuit and an amplifier circuit, and releases a sound indicated by audio data supplied from the CPU 11.

Figure 2:
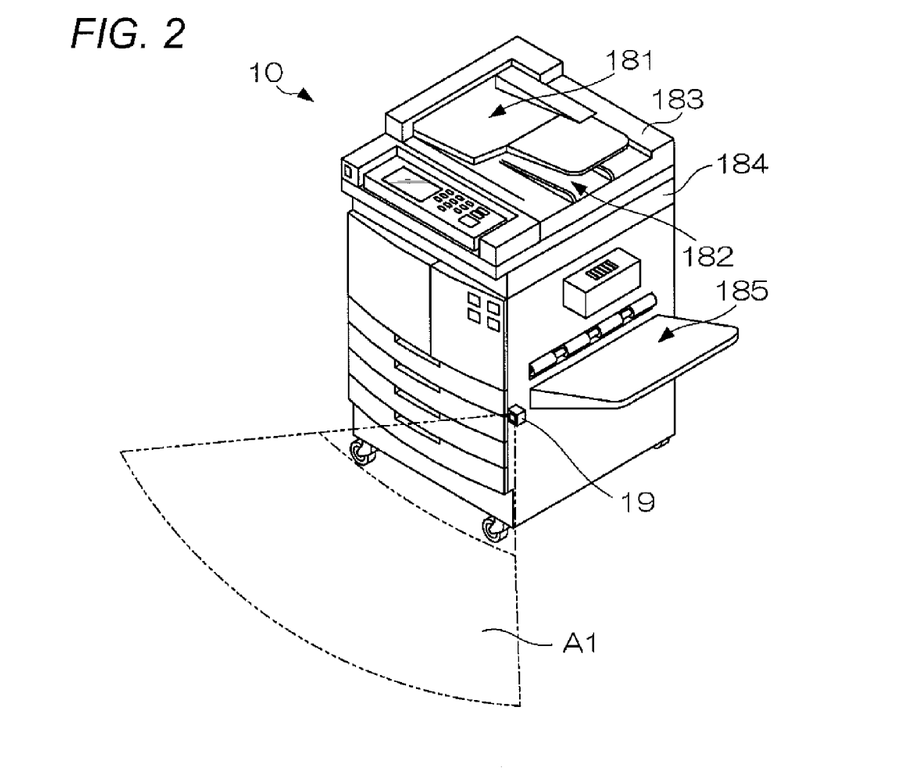
FIG. 2 is a diagram illustrating an outer appearance of the image processing system.

FIG. 2 illustrates an outer appearance of the image processing system 10. The image processing system 10 is assumed as a front face where the operation panel 15 is provided, and is used by the user standing in front of the front face. In the upper portion of the image processing system 10, there is provided an original document feeding unit 181 which transports the original documents set therein and an original document receiving unit 182 which discharges the original documents transported by the original document feeding unit 181. The original document feeding unit 181 and the original document receiving unit 182 are formed integrally to an original document cover 183.

An original document platen 184 is provided below the original document cover 183. The image scanner 16 reads out the image of both the original document transported from the original document feeding unit 181 and the original document set in the original document platen 184. In a side of the image processing system 10, a sheet discharging unit 185 is provided to discharge a sheet on which the image is formed by the printer 17.

In the side of the image processing system 10, the digital camera 19 is provided. The digital camera 19 is on the front face of the image processing system 10 and includes a lens directed obliquely toward the floor. The digital camera 19 captures an area μl where feet of the user standing in front of the image processing system 10 are positioned so as to capture the feet of the user who tries to use the own device.

The CPU 11 of the image processing system 10 executes a program to control the respective units, so that functions are realized as will be described below.

Figure 3:
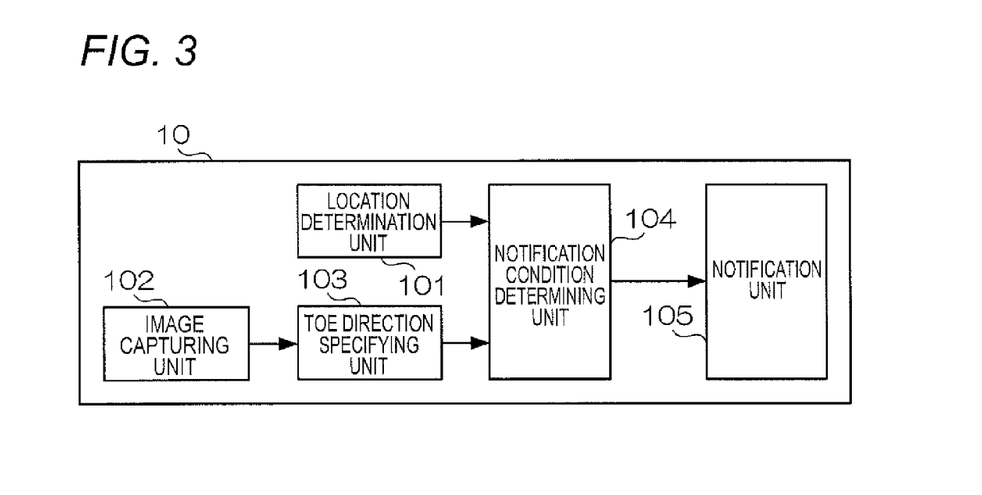
FIG. 3 is a diagram illustrating a functional configuration to be realized by the image processing system.

FIG. 3 is a functional configuration to be realized by the image processing system 10. The image processing system 10 includes a location determination unit 101, an image capturing unit 102, a toe direction specifying unit 103, a notification condition determining unit 104, and a notification unit 105.

The location determination unit 101 functions to determine whether an object is present in a predetermined place (whether an object is located), and is an instance of a "determination unit" of the invention. In this example, the location determination unit 101 determines whether an object is present in a predetermined place such as the original document feeding unit 181, the original document receiving unit 182, the original document platen 184, and the sheet discharging unit 185 illustrated in FIG. 2. In these respective units, there is provided sensors for detecting the presence or absence of the original document or the sheet on which the image is formed. The location determination unit 101 determines the presence or absence of an object based on the outputs of the sensors. The location determination unit 101 repeatedly performs the determination at predetermined time intervals (for example, one second), and notifies the determination result to the notification condition determining unit 104 every time.

The image capturing unit 102 captures the area μl illustrated in FIG. 2 and captures the feet of the user who tries to use the own device. The image capturing unit 102 repeatedly performs the capturing at a predetermined time interval (for example, 1 second), and supplies the captured image to the toe direction specifying unit 103 every time.

The toe direction specifying unit 103 functions to specify a direction of the toe of the user who uses the own device, and is an instance of a "specification unit" of the invention. The toe direction specifying unit 103 specifies the direction of the user's toe on the basis of the image of the user's foot captured by the image capturing unit 102. As a method of specifying the direction of the toe, for example, a method disclosed in JP-A-2015-2382 may be used.

In a case where the method is used, the toe direction specifying unit 103 extracts an image of the user's foot from the image captured by the image capturing unit 102. Assuming a two-dimensional coordinate system having the center of an ankle in the extracted foot image as an origin and being expressed by an x axis perpendicular to the front direction of the own device and an y axis in parallel with the front direction and, the toe direction specifying unit calculates the coordinates of the toe in the extracted foot image.

Figure 4:
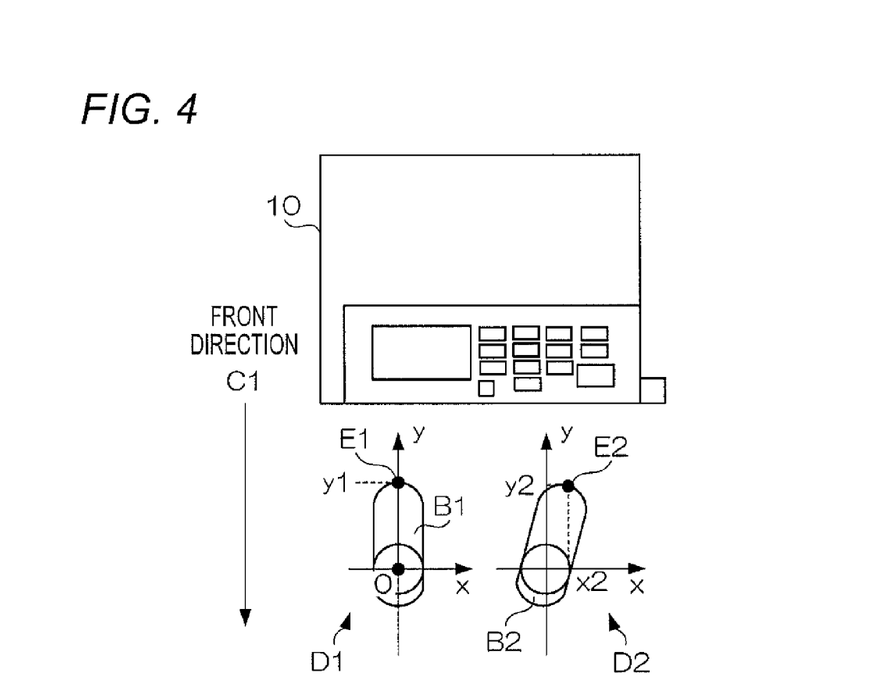
FIG. 4 is a diagram illustrating an instance of a foot image and a coordinate system.

FIG. 4 illustrates an instance of the foot image and the coordinate system. In the instance of FIG. 4, a foot image B1 indicating a user's left foot and a foot image B2 indicating a user's right foot are illustrated. In addition, there is illustrated a two-dimensional coordinate system D1 having the center of the ankle in the foot image B1 as an origin and including the x axis perpendicular to a front direction C1 of the image processing system 10 and the y axis in parallel with the front direction C1. There is illustrated a two-dimensional coordinate system D2 having the center of the ankle in the foot image B2 as an origin and being expressed by the same x and y axes. In the two-dimensional coordinate systems D1 and D2, a direction from right to left when viewed from the image processing system 10 is set to the forward direction of the x axis, and a direction toward the front surface of the image processing system 10 is set to the forward direction of the y axis.

In the instance of FIG. 4, the toe direction specifying unit 103 calculates a coordinate of a toe E1 extracted from the foot image B1 as (0, y1), and calculates a coordinate of a toe E2 extracted from the foot image B2 as (x2, y2). Herein, all of y1, x2, and y2 have a positive value. The toe direction specifying unit 103 calculates a protruding quantity and a protruding direction of the toe from the calculated coordinates of the toe, and specifies the direction of the toe based on the calculated protruding quantity and the calculated protruding direction.

When specifying the direction of the toe, the toe direction specifying unit 103 supplies specification result information indicating the specified result (the direction of the toe) to the notification condition determining unit 104. The specification result information is expressed by, for example, a vector component directing from the center of the ankle toward the toe as represented by the assumed two-dimensional coordinate system. According to the instance of FIG. 4, the direction of the toe of the left foot is expressed as (0, y1), and the direction of the toe of the right foot is expressed as (x2, y2).

The notification condition determining unit 104 determines whether a condition (notification condition) for making the notification to the user is satisfied. As a notification condition, the notification condition determining unit 104 uses a condition satisfied in a case where the toe direction specifying unit 103 specifies the predetermined direction of the toe and the location determination unit 101 determines that an object is present in the predetermined place. In this example, in a case where the direction of the toe not facing the own device (the image processing system 10) is specified at least in one foot, the notification condition determining unit 104 determines that the predetermined direction of the toe is specified.

Figure 5A:
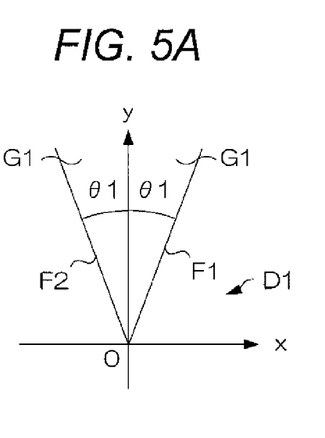
FIGS. 5A and 5B are diagrams for describing a predetermined direction of a toe.
Figure 5B:
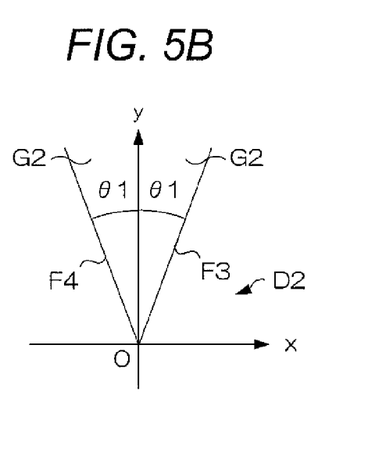

FIGS. 5A and 5B are diagrams for describing the predetermined direction of the toe. In FIG. 5A, there is illustrated straight lines F1 and F2 (the straight line F1 is in a first quadrant and the straight line F2 is in a second quadrant) which pass through the origin of the two-dimensional coordinate system D1 to form an angle θ1 with respect to the y axis, and an area G1 interposed between the straight lines F1 and F2. In FIG. 5B, there is illustrated straight lines F3 and F4 (the straight line F3 is in a first quadrant and the straight line F4 is in a second quadrant) which pass through the origin of the two-dimensional coordinate system D2 to form an angle θ1 with respect to the y axis, and an area G2 interposed between the straight lines F3 and F4.

In this example, when a vector component indicating the direction of the toe of the left foot specified by the toe direction specifying unit 103 is included in the area G1 and a vector component indicating the specified direction of the toe of the right foot is included in the area G2, the notification condition determining unit 104 determines that the predetermined direction of the toe (the toes of both feet are in a direction facing the own device) is specified. In other words, when both directions of the toes of the user's both feet are deviated within the angle θ1 or less with respect to the opposite direction (the y axis direction of the two-dimensional coordinate system D1) of the front direction C1 of the image processing system 10, the notification condition determining unit 104 determines that the predetermined direction of the toe is specified.

In a case where it is determined that the predetermined direction of the toe is specified, and when the latest determination result supplied from the location determination unit 101 shows a result that an object is present in each unit such as the original document feeding unit 181 illustrated in FIG. 2, the notification condition determining unit 104 determines that the notification condition is satisfied. When determining that the notification condition is satisfied, the notification condition determining unit 104 notifies the fact to the notification unit 105. In a case where it is determined that the predetermined direction of the toe is not specified, or in a case where the predetermined direction of the toe is specified but it is determined that no object is present in each unit, the notification condition determining unit 104 determines that the notification condition is not satisfied and does not notify the fact to the notification unit 105.

In a case where the fact that the notification condition is satisfied is notified from the notification condition determining unit 104, the notification unit 105 performs a notification to the user. In other words, in a case where the toe direction specifying unit 103 specifies the predetermined direction of the toe and the location determination unit 101 determines that an object is present in the predetermined place, the notification unit 105 performs a notification to the user. Furthermore, in a case where the direction of the toe not facing the own device is specified at least in one foot, the notification unit 105 determines that the predetermined direction of the toe is specified, and performs a notification to the user.

For example, the notification unit 105 performs a notification to the user by emitting a sound such as a warning or a voice "You have something forgotten" through the speaker 20. While not limited hereto, the notification unit 105 may perform a notification, for example, by displaying a character string "You have something forgotten" in the operation panel 15. In a case where the user uses the image processing system 10 after user authentication is allowed, the notification unit 105 may perform a notification by transmitting a character string "You have something forgotten" to a registered electronic address of the user or an account of SNS (Social Networking Service).

The image processing system 10 performs a notification process of notifying the fact of forgetting to take an original document to the user based on the above configuration.

Figure 6:
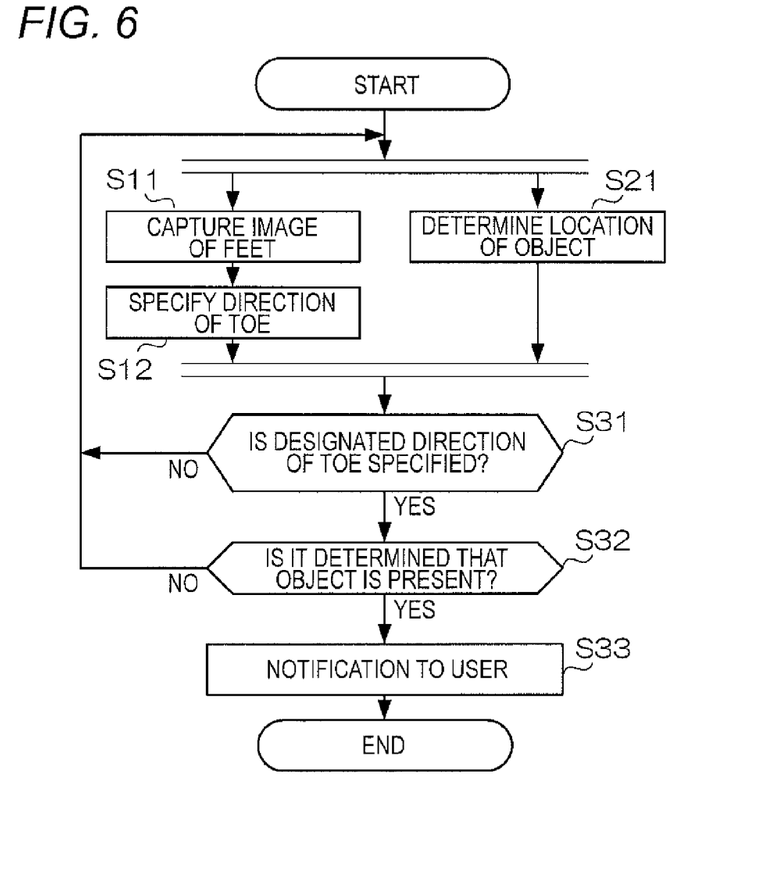
FIG. 6 is a diagram illustrating an instance of an operational sequence of the image processing system in a notification process.

FIG. 6 illustrates an instance of an operational sequence of the image processing system 10 in the notification process. The operational sequence is started by being triggered at a user's operation with respect to the image processing system 10.

First, the image processing system 10 (the image capturing unit 102) captures an image of the foot of the user who uses the own device (Step S11). Next, the image processing system 10 (the toe direction specifying unit 103) specifies the direction of the toe of the user based on the captured image (Step S12). The image processing system 10 (the location determination unit 101) determines a location of an object in the predetermined place (whether an object is present in each unit such as the original document feeding unit 181 illustrated in FIG. 2) in parallel with the operations in Steps S11 and S12 (Step S21).

Next, the image processing system 10 (the notification condition determining unit 104) determines whether the predetermined direction of the toe is specified in Step S12 (Step S31). In a case of determining that the predetermined direction is not specified (NO), the image processing system 10 returns to Steps S11 and S21 and repeatedly performs the operations. In a case of determining that the predetermined direction is specified in Step S31 (YES), the image processing system 10 (the notification condition determining unit 104) determines whether it is determined that an object is present in the predetermined place (Step S32). In a case of determining that it is not determined (NO), the image processing system 10 returns to Steps S11 and S21 and repeatedly performs the operations. In a case of determining that it is determined in Step S32 (YES), the image processing system 10 (the notification unit 105) performs a notification to the user (Step S33).

In order to notify it to the user who has forgotten to take the object from the predetermined place, for example, there is a method of detecting a use's face from the captured image of the user and perform a notification when the face is not detected. In this method, however, since a human face is at a high position in the body, an interior lighting easily appears behind when the face is captured. Therefore, the user's face is captured dark due to backlight, and thus the accuracy in detection is likely to be degraded. In this example, since the notification is performed based on the result of specifying the direction of the toe which is positioned at a lower portion of the human body, the lighting hardly appears on the image used to specify compared to a case where the face is captured, and thus it does not hardly become the backlight. Accordingly, the notification of forgetting to take the object can be more accurately performed compared to a case where the notification is performed based on the detection result of the user's face.

[2] Modifications

The above-described example is merely given as an instance of the invention, and may be modified as follows. In addition, the example and the respective modifications may be combined as needed.

[2-1] Directions of Toes of Both Feet

A notification condition used herein may be different from that in the example. For example, in the example, the description has been made about that the notification condition is satisfied in a case where the direction of the toe not facing the own device is specified at least in one foot. However, a condition satisfied in a case where the direction of the toe not facing the own device is specified in both feet may be used as the notification condition.

Figure 7A:
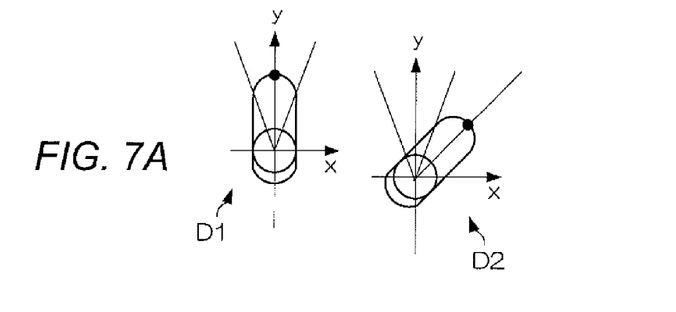
FIGS. 7A and 7B are diagrams for describing a predetermined direction of a toe according to a modification.

FIGS. 7A and 7B are diagrams for describing the direction of the toe determined in this modification. In FIG. 7A, while the direction of the toe of the left foot is deviated within the angle θ1 or less with respect to they axis, the direction of the toe of the right foot is deviated exceeding the angle θ1 with respect to the y axis. In this case, the notification condition determining unit 104 determines that the predetermined direction of the toe is specified according to the example. However, in this modification, since the left foot is placed toward the own device, the notification condition determining unit determines that the predetermined direction of the toe is not specified.

Figure 7B:
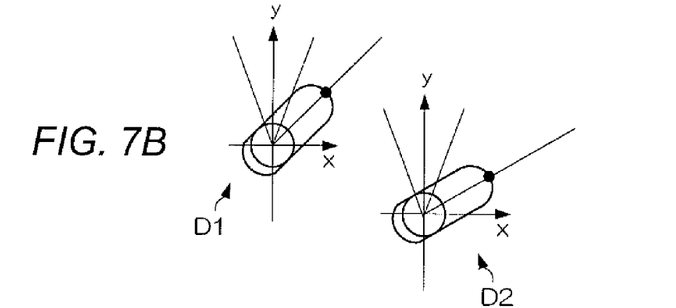

In FIG. 7B, the directions of the toes of both right and left feet are deviated exceeding the angle θ1 with respect to the y axis. In this case, in this modification, since both feet are placed not toward the own device, the notification condition determining unit 104 determines that the predetermined direction of the toe is specified. As a result, in a case where the direction of the toe not facing the own device is specified in both feet, the notification unit 105 performs a notification to the user assuming that the predetermined direction of the toe is specified.

In the example, the notification can be performed at early timing compared to the case of waiting until the directions of the toes of both feet are changed as in this modification. On the other hand, even in a case where the user changes the direction of one foot once as illustrated in FIG. 7A, and then turns to the image processing system 10 again for the operation after having second thought, the notification is performed. In addition, in a case where the user comes on foot from the side of the image processing system 10, the user may stop while the direction of one foot is placed in an approximate walking direction. Therefore, it may be considered that the user uses the image processing system 10 while keeping the direction of the toe as illustrated in FIG. 7A. In this modification, the notification is awaited until the directions of the toes of both feet are changed as described above, and while the user keeps on using the own device, the notification is less performed compared to a case the notification is performed only when the direction of the toe of one foot is detected as described in the example.

[2-2] Information Processing Apparatus

The above respective instances have been described about the image processing system which performs the image processing, but the invention may be applied to another information processing apparatus without being limited thereto. For example, when the invention is applied to an information processing apparatus (for example, a kiosk terminal, ATM (Automatic Teller Machine), or an automatic ticket machine which is installed in a store or the like to issue a ticket or a receipt of a purchased service) where the user may forget to take an object, the notification of the forgetting to take the object is accurately performed as described in the example.

[2-3] Predetermined Place

The place on which the location determination unit 101 determines the presence or absence of an object is not limited to that described in the example. For instance, in a case where the own device has a function of inserting a card (a credit card or a prepaid card) for charging, the location determination unit 101 determines whether an object (the card in this case) is present in the insertion apparatus of the card as the predetermined place.

In a case where the own device has a function of inserting cash for charging, the location determination unit 101 determines whether an object (the cash in this case) is present in an output port for a change of a charging apparatus such as a coin kit as the predetermined place. The location determination unit 101 determines whether an object is present in the output port of a ticket or a receipt in a case where the own device is the kiosk terminal, or in the output port of an issued ticket in the case of the automatic ticket machine.

[2-4] Types of Forgotten Object

The notification condition may be differently used according to the types of the object (that is, forgotten object) that the user forgets to take from the predetermined place.

Figure 8:
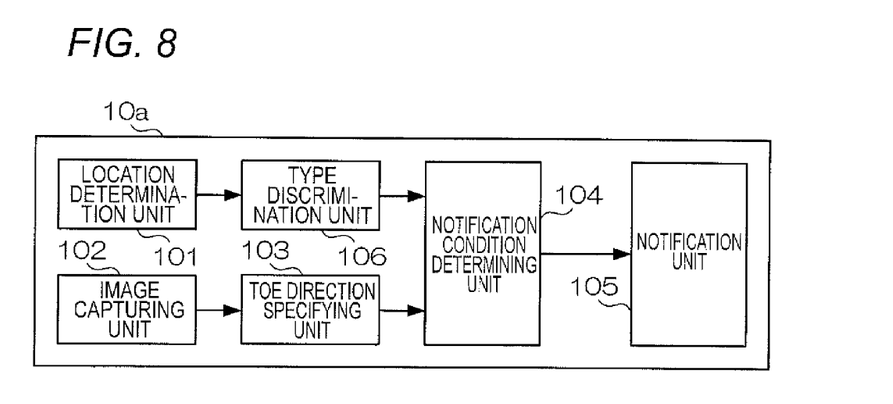
FIG. 8 is a diagram illustrating a functional configuration to be realized by an image processing system according to the modification.

FIG. 8 illustrates a functional configuration to be realized by an image processing system 10a according to this modification. The image processing system 10a is provided with a type discrimination unit 106 in addition to the respective units illustrated in FIG. 3.

In this modification, the location determination unit 101 supplies information indicating a place which is determined that there is an object, as a determination result, to the type discrimination unit 106. The type discrimination unit 106 discriminates the type of the object which is determined as being in the predetermined place by the location determination unit 101. The type discrimination unit 106 is an instance of a "discrimination unit" of the invention. In a case where the supplied determination result indicates the original document receiving unit 182, the type discrimination unit 106 analyzes an image read out by the image scanner 16 (that is, an image drawn in an original document which is determined as being in the document receiving unit 182) to discriminate the type of the original document.

For instance, in a case where a specific character string "driver's license" or "individual certificate of health insurance card" is read out from a specific position, the type discrimination unit 106 discriminates the types (the driver's license and the health insurance card) of these original documents on the basis of the character string. Further, the type discrimination unit 106 may store patterns of ruled lines corresponding to the types of the original document, and discriminate the type corresponding to a ruled line of a pattern similar to the ruled line extracted from the read-out image as the type of the original document.

Even in a case where the supplied determination result indicates the original document platen 184, the type discrimination unit 106 discriminates the type of the original document through the above-described method. In a case where the supplied determination result indicates the sheet discharging unit 185, the type discrimination unit 106 interprets the image formed by the printer 17 to discriminate the type of the original document through the above-described method. For instance, in a case where the own device has a business card scan function and a post card scan function, the type discrimination unit 106 discriminates the type (the business card or the post card) of the original document corresponding to the used function when these functions are used.

In addition, the type discrimination unit 106 may discriminate the type corresponding to the place where the location determination unit 101 determines the presence or absence of the an object. For instance, in a case where the own device includes a card insertion apparatus and the charging apparatus, the type discrimination unit 106 discriminates a card (a card corresponding to the apparatus such as a credit card or a prepaid card) as the type of the object when it is determined that the object is in the card insertion apparatus, or discriminates a cash as the type of the object when it is determined that the object is in the charging apparatus. The type discrimination unit 106 notifies the discriminated type of object to the notification condition determining unit 104.

The notification condition determining unit 104 determines whether the notification condition is satisfied according to the type discriminated by the type discrimination unit 106. The notification condition determining unit 104 performs the determination using a notification condition table associating the type of the object and the notification condition with each other.

Figure 9:
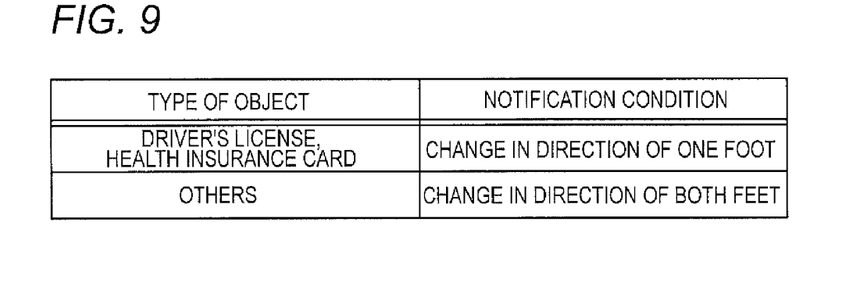
FIG. 9 is a diagram illustrating an instance of a notification condition table.

FIG. 9 illustrates an instance of the notification condition table. In FIG. 9, a notification condition "Change in direction of one foot" is associated with the type of the object "Driver's license, Health insurance card". A notification condition "Change in direction of both feet" is associated with the type of the object "Others".

"Change in direction of one foot" indicates the notification condition (a condition in a case where the direction of the toe not facing the own device is specified at least in one foot) used in the example. "Change in direction of both feet" indicates the notification condition (a condition in a case where the direction of toe not facing the own device is specified in both feet) used in the modification. The notification condition determining unit 104 determines whether the notification condition is satisfied, using the notification condition associated with the type of the object notified from the type discrimination unit 106 in the notification condition table.

Therefore, the notification unit 105 separately uses a first method of making a notification depending on the type of the object discriminated by the type discrimination unit 106 in a case where the direction of the toe not facing the own device is specified at least in one foot, and a second method of making a notification depending on the type of the object discriminated by the type discrimination unit 106 in a case where the direction of the toe not facing the own device is specified in both feet. For instance, when the notification condition table illustrated in FIG. 9 is used, the first method may be used for an important object such as the driver's license and the health insurance card. Therefore, the notification is performed at early timing compared to the case of the second method.

In addition, the second method may be used for other objects. Therefore, while the user keeps on using the own device, the notification is less performed compared to the case of the first method. In this way, according to this modification, a timing of the notification is changed depending on the type of the object present in the predetermined place. A degree of suppressing the notification to the user who uses the own device is changed depending on the type of the object present in the predetermined place.

[2-5] Quantity of Forgotten Objects

The notification condition may be differently used depending on the quantity of forgotten objects.

Figure 10:
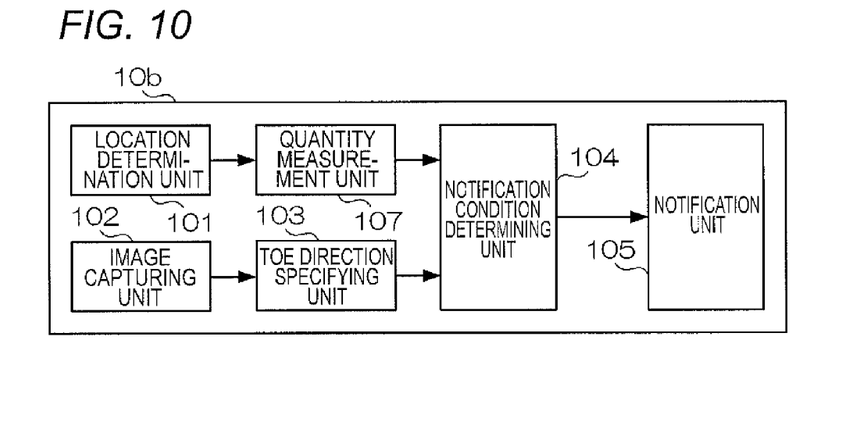
FIG. 10 is a diagram illustrating a functional configuration to be realized by the image processing system according to the modification.

FIG. 10 illustrates a functional configuration to be realized by an image processing system 10b according to this modification. The image processing system 10b is provided with a quantity measurement unit 107 in addition to the respective units illustrated in FIG. 3.

In this modification, the location determination unit 101 supplies information indicating a place which is determined that there is an object therein, as a determination result, to the quantity measurement unit 107. The quantity measurement unit 107 measures the quantity of objects which are determined as being in the predetermined place by the location determination unit 101. The quantity measurement unit 107 is an instance of a "measurement unit" of the invention. In a case where the supplied determination result indicates the document receiving unit 182, the quantity measurement unit 107 measures the number of original documents, from which an image is read out by the image scanner 16, as the quantity of objects.

In a case where the supplied determination result indicates the document stage 184, the quantity measurement unit 107 measures one sheet as the quantity of objects because one original document is normally placed in the original document platen 184. In a case where the supplied determination result indicates the sheet discharging unit 185, the quantity measurement unit 107 measures the number of sheets in which the printer 17 forms an image, as the quantity of objects. In addition, when it is determined that an object is present in the card insertion apparatus, the quantity measurement unit 107 measures one sheet (the number of cards) as the quantity of objects. When it is determined that an object is present in the charging apparatus, the quantity measurement unit 107 takes in a change from the charging apparatus and measures the cash as the quantity of objects.

The quantity measurement unit 107 notifies the measured quantity of objects to the notification condition determining unit 104.

The notification condition determining unit 104 determines whether the notification condition is satisfied depending on the quantity of objects measured by the quantity measurement unit 107. The notification condition determining unit 104 performs the determination using the notification condition table associating the quantity of objects and the notification condition with each other.

Figure 11:
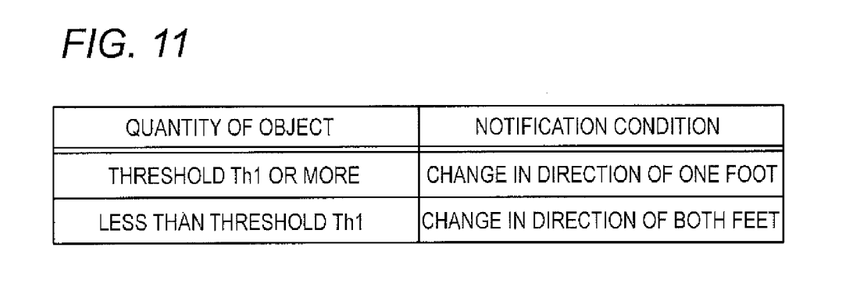
FIG. 11 is a diagram illustrating an instance of the notification condition table.

FIG. 11 illustrates an instance of the notification condition table. In FIG. 11, the notification condition "Change in direction of one foot" is associated with the quantity of objects "Threshold Th1 or more". The notification condition "Change in direction of both feet" is associated with the quantity of objects "Less than threshold Th1". In a case where the number of original documents is measured as the quantity of objects, the number of original document such as "10" or "20" is used as the threshold Th1. In a case where the change is measured as the quantity of objects, the cash such as "1000 Yen" or "2000 Yen" is used as the threshold Th1.

The notification condition determining unit 104 determines whether the notification condition is satisfied using the notification condition associated with the quantity of objects notified from the quantity measurement unit 107 in the notification condition table. Therefore, the notification unit 105 separately uses a first method (the method of making a notification in a case where the direction of the toe not facing the own device is specified at least in one foot) and a second method (the method of making a notification in a case where the direction of the toe is specified in both feet) depending on the quantity of objects measured by the quantity measurement unit 107.

For instance, when the notification condition table illustrated in FIG. 11 is used, the first method is used in a case where the measured quantity of forgotten objects is equal to or more than the threshold Th1. Therefore, the notification is performed at early timing compared to the case of the second method. In a case where the measured quantity of objects is less than the threshold Th1, the second method is used. Therefore, while the user keeps on using the own device, the notification is less performed compared to the case of the first method. In this way, according to this modification, a timing of the notification is changed depending on the quantity of objects in the predetermined place. In addition, a degree of suppressing the notification to the user who uses the own device is changed depending on the quantity of object in the predetermined place.

[2-6] Character Information

The notification condition may be differently used depending on character information of a forgotten object.

Figure 12:
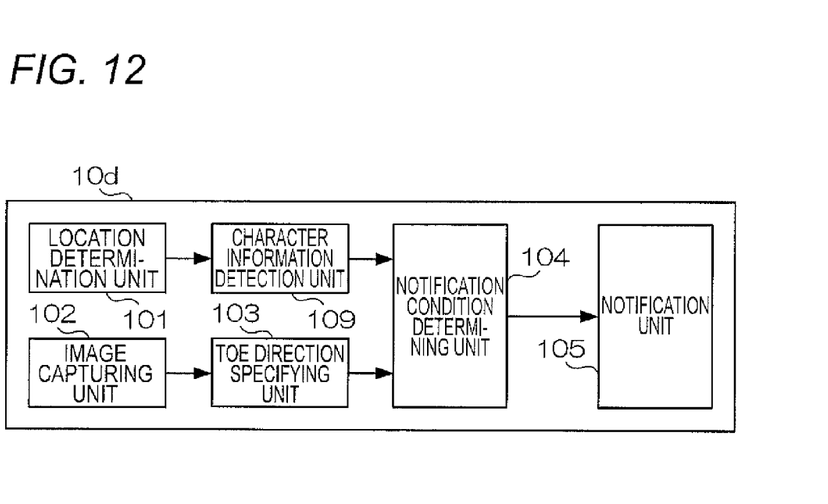
FIG. 12 is a diagram illustrating a functional configuration to be realized by the image processing system according to the modification.

FIG. 12 illustrates a functional configuration to be realized by an image processing system 10d according to this modification. The image processing system 10d is provided with a character information detection unit 109 in addition to the respective units illustrated in FIG. 3. In this modification, the location determination unit 101 supplies information indicating a place which is determined that an object is present therein, as a determination result, to the character information detection unit 109. The character information detection unit 109 detects the character information of the object which is determined as being in the predetermined place by the location determination unit 101. The character information detection unit 109 is an instance of a "detection unit" of the invention.

In a case where the supplied determination result indicates the document receiving unit 182 and the document stage 184, the character information detection unit 109 detects the character information from the image of the original document read out by the image scanner 16 using an OCR (Optical character recognition) technique. In a case where the supplied determination result indicates the sheet discharging unit 185, the character information detection unit 109 detects the character information from the image formed by the printer 17 using the OCR technique. The character information detection unit 109 supplies the detected character information to the notification condition determining unit 104.

The notification condition determining unit 104 determines whether the notification condition is satisfied depending on the character information detected by the character information detection unit 109. The notification condition determining unit 104 performs the determination using the notification condition table associating a keyword contained in the character information and the notification condition with each other.

Figure 13:
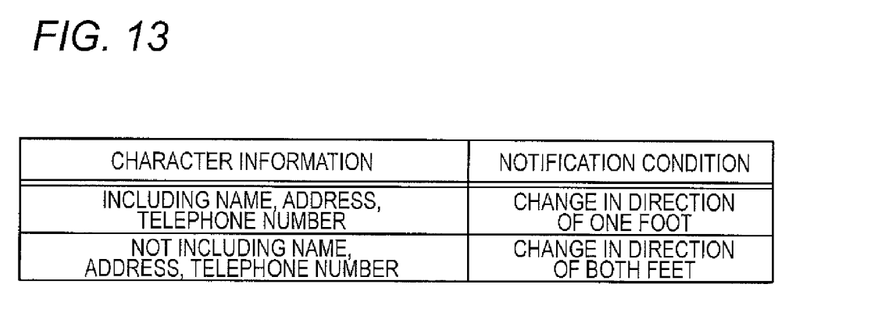
FIG. 13 is a diagram illustrating an instance of the notification condition table.

FIG. 13 illustrates an instance of the notification condition table. In FIG. 13, the notification condition "Change in direction of one foot" is associated with the character information "Including Name, Address, Telephone Number". The notification condition "Change in direction of both feet" is associated with the character information "Not including Name, Address, Telephone Number".

The notification condition determining unit 104 determines whether the notification condition is satisfied using the notification condition associated with the character information supplied from the character information detection unit 109 in the notification condition table. Therefore, the notification unit 105 separately uses a first method (the method of making the notification in a case where the direction of the toe not facing the own device is specified at least in one foot) and a second method (the method of making the notification in a case where the direction of the toe not facing the own device is specified in both feet) depending on the character information detected by the character information detection unit 109.

For instance, when the notification condition table illustrated in FIG. 13 is used, the first method is used in a case where the character information including name, address, and telephone number is detected. Therefore, the notification is performed at early timing compared to the case of the second method. In a case where the character information not including name, address, and telephone number is detected, the second method is used. Therefore, while the user keeps on using the own device, the notification is less performed compared to the case of the first method. In this way, according to this modification, a timing of the notification is changed depending on the character information of the object in the predetermined place. In addition, a degree of suppressing the notification to the user who uses the own device is changed depending on the character information of the object in the predetermined place.

[2-7] Capturing Image

The image processing system may not capture an image.

Figure 14:
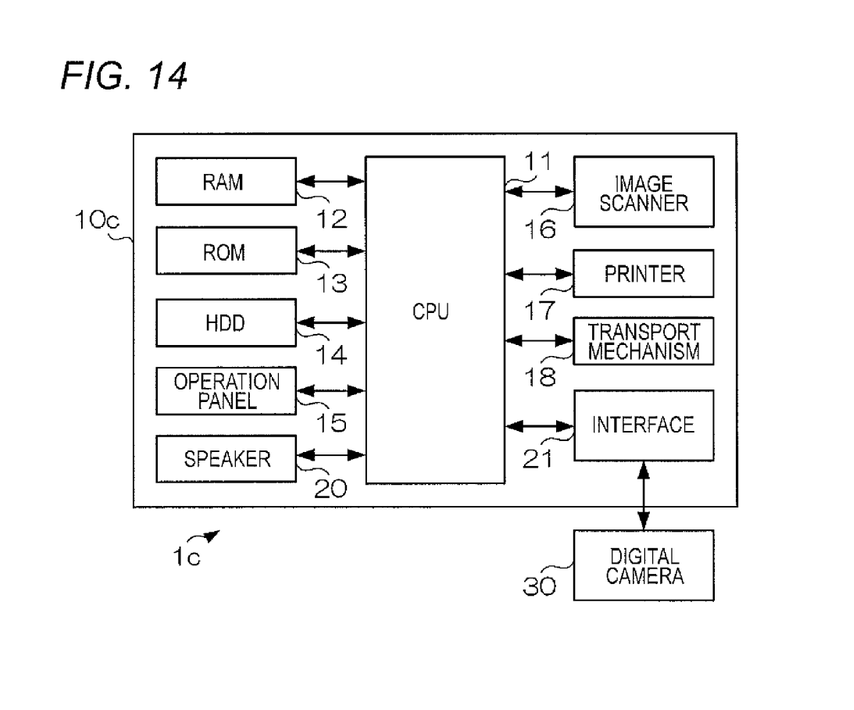
FIG. 14 is a diagram illustrating a hardware configuration of an image processing system according to the modification.

FIG. 14 illustrates a hardware configuration of an image processing system 1c according to this modification. The image processing system 1c is provided with the image processing system 10c and a digital camera 30. The image processing system 10c is provided with the components from the CPU 11 to the transport mechanism 18 illustrated in FIG. 1, the speaker 20, and an interface 21. The interface 21 relays the exchange of data with the digital camera 30.

The digital camera 30 is provided in the vicinity of the image processing system 10c, and captures an image of the feet of the user who uses the image processing system 10e.

Figure 15:
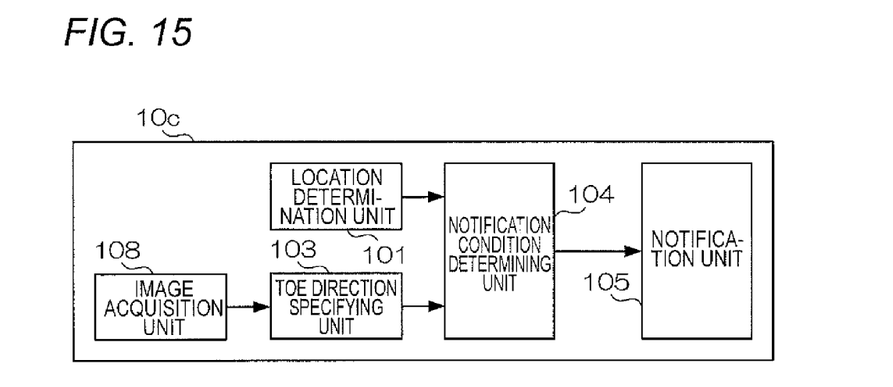
FIG. 15 is a diagram illustrating a functional configuration to be realized by the image processing system.

FIG. 15 illustrates a functional configuration to be realized by the image processing system 10c. The image processing system 100 is provided with an image acquisition unit 108 in addition to the location determination unit 101, the toe direction specifying unit 103, the notification condition determining unit 104, and the notification unit 105 illustrated in FIG. 3. The image acquisition unit 108 acquires an image obtained by capturing the surrounding of the own device from an external image capturing device (the digital camera 30 in this instance). The toe direction specifying unit 103 specifies the direction of the toe based on the image acquired by the image acquisition unit 108 (that is, the captured image of the feet of the user who uses the own device).

[2-8] Determination on Direction of Toe

In the example, the notification condition determining unit 104 has determined that the predetermined direction of the toe is specified in a case where the directions of the toes of the user's both feet are deviated within the angle θ1 or less, but the angle θ1 may vary. For instance, the notification condition determining unit 104 sets, as the angle θ1, an angle θ2 according to the type of the forgotten object described in the modification. In a case where the directions of the toes of the user' both feet is deviated within the angle θ2, the notification condition determining unit determines that the predetermined direction of the toe is specified. For instance, the notification condition determining unit 104 performs the determination using a toe direction table in which the type of the object and a threshold of deviation in direction of the toe are associated with each other.

Figure 16A:
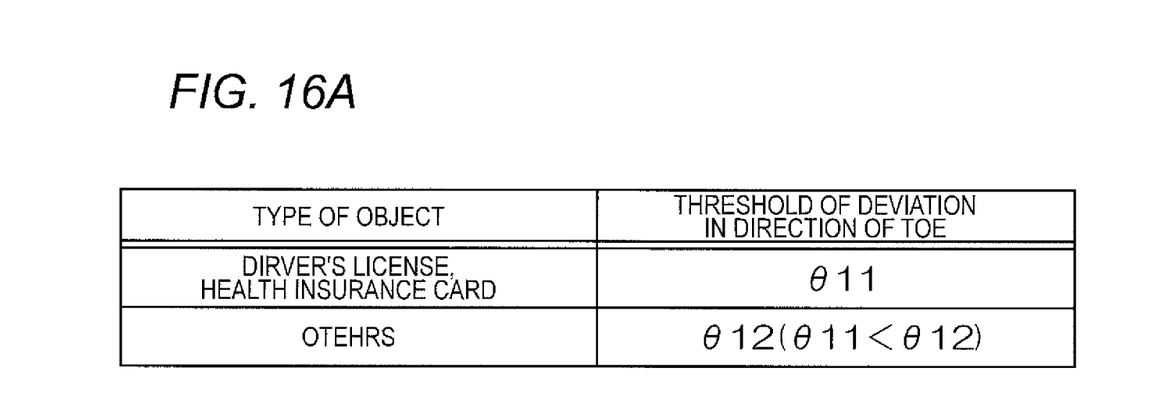
FIGS. 16A and 16B are diagrams illustrating an instance of a toe direction table.

FIGS. 16A and 16B illustrate an instance of the toe direction table. In FIG. 16A, a threshold "θ11" of deviation in direction of the toe is associated with the type of the object "Driver's license, Health insurance card". A threshold "θ12 (θ11<θ12)" of deviation in direction of the toe is associated with the type of the object "Others". In a case where the deviation in direction of the user's toe is equal to or less than the threshold of the deviation in direction of the toe associated with the type of the object notified from the type discrimination unit 106 illustrated in FIG. 8 in the toe direction table, the notification condition determining unit 104 determines that the predetermined direction of the toe is specified.

In the instance of FIG. 16A, when the type of the object is "Driver's license, Health insurance card", it is determined that the predetermined direction of the toe is specified even when the direction of the foot is slightly changed compared to a case where the type of the object is "Others". Therefore, the notification to the user is performed at early timing. Therefore, in a case where an important object such as the driver's license or the health insurance card is forgotten, the notification is performed at early timing compared to a case where other objects are forgotten.

Figure 16B:
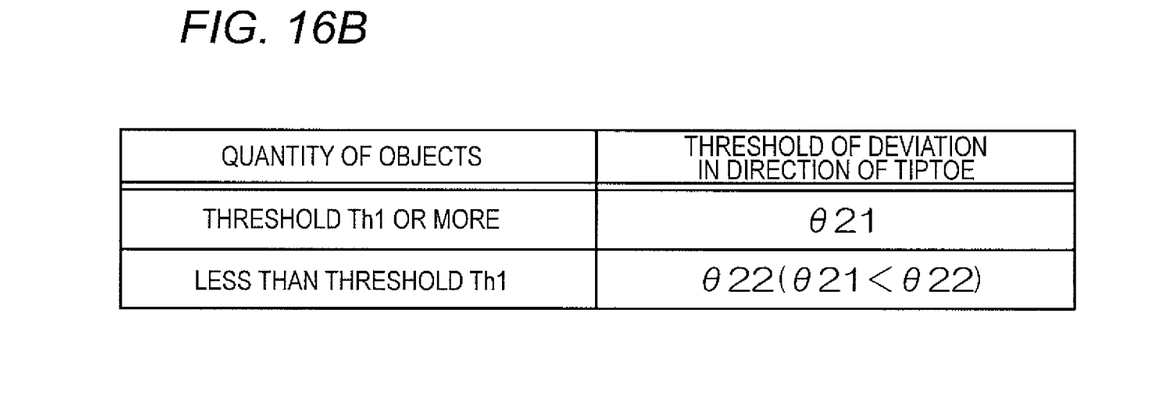

In FIG. 16B, a threshold "θ21" of the deviation in direction of the toe is associated with the quantity of objects "Threshold Th1 or more". A threshold "θ22 (θ21<θ22)" of the deviation in direction of the toe is associated with the quantity of objects "Less than threshold Th1". Through the determination of the notification condition determining unit 104 as described in the instance of FIG. 16B, in a case where the quantity of objects is large (the measured value is equal to or more than the threshold Th1), the notification to the user is performed at early timing compared to a case where the quantity of objects is small (the measured value is less than the threshold Th1). A correspondence relation between the quantity of objects and the deviation in direction of the toe may be opposite to that of this instance. Even in this modification, a timing of the notification is changed depending on the quantity of objects in the predetermined place, and the degree of suppressing the notification to the user who uses the own device is changed.

[2-9] Category of Invention

The invention is implemented as an information processing method which realizes a process of the information processing apparatus besides the information processing apparatus for realizing the respective units illustrated in FIG. 3 similarly to the above-described image processing system, and is implemented as a program which, when executed by a computer, causes the computer to perform a function of controlling the information processing apparatus. The program may be provided in a form of a recording medium such as an optical disk storing the program therein, or may be installed and usable by being downloaded to the computer through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a sensor that detects whether an original document having a first image thereon or a sheet on which the first image is formed is present in a predetermined place;
    an image scanner configured to read the first image on the original document;
    a camera configured to capture a second image of an area in front of the information processing apparatus; and
    a CPU that executes a process comprising:
        analyzing the first image read by the image scanner to discriminate a type of the original document;
        specifying each direction of one toe or two toes of a user captured in the second image;
        determining whether a condition to perform a notification to the user is satisfied; and
        performing the notification when the condition is satisfied,
    wherein the CPU determines that the condition is satisfied when:
        at least one direction of the toe is in a predetermined angle range when the sensor detects the original document or the sheet, and the type of the original document is a predetermined type; and
        both of the two directions of the toes are in the predetermined angle range when the sensor detects the original document or the sheet, and the type of the original document is not the predetermined type.

2. The information processing apparatus according to claim 1, wherein the CPU discriminates the type of the original document on the basis of a character string read out from a specific position in the first image.

3. The information processing apparatus according to claim 1, wherein the sensor detects the original document on an original document platen on which the original document is set.

4. The information processing apparatus according to claim 1, wherein the sensor detects the original document on an original document receiving unit on which the original document is discharged.

5. The information processing apparatus according to claim 1, wherein the sensor detects the sheet on a sheet discharging unit on which the sheet is discharged.

6. A non-transitory computer readable storage medium storing a program causing an information processing apparatus to execute a process comprising:
    detecting whether an original document having a first image thereon or a sheet on which the first image is formed is present in a predetermined place;
    reading the first image on the original document;
    analyzing the first image read from the original document to discriminate a type of the original document;
    capturing a second image of an area in front of the information processing apparatus;
    specifying each direction of one toe or two toes of a user captured in the second image;
    determining that a condition to perform a notification to the user is satisfied when:
        at least one direction of the toe is in a predetermined angle range when a sensor detects that the original document or the sheet is present in a predetermined place if the type of the original document is a predetermined type; and
        both of the two directions of the toes are in the predetermined angle range when the sensor detects that the original document or the sheet is present in a predetermined place if the type of the original document is not the predetermined type; and
    performing the notification when the condition is satisfied.

* * * * *